US005943330A

United States Patent [19]
Hottinen

[11] Patent Number: 5,943,330
[45] Date of Patent: *Aug. 24, 1999

[54] DATA TRANSMISSION METHOD, TRANSMITTER, AND RECEIVER

[75] Inventor: Ari Hottinen, Vantaa, Finland

[73] Assignee: Nokia Mobile Phones Ltd., Salo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/736,067

[22] Filed: Oct. 23, 1996

[30] Foreign Application Priority Data

Oct. 26, 1995 [FI] Finland ................................ 955113

[51] Int. Cl.$^6$ .................................................. H04J 13/00
[52] U.S. Cl. ........................................... 370/335; 370/342
[58] Field of Search ..................................... 370/320, 328, 370/335, 342, 465, 468, 441; 375/200, 206, 207, 208, 209, 210

[56] References Cited

U.S. PATENT DOCUMENTS

| | | | |
|---|---|---|---|
| 5,084,900 | 1/1992 | Taylor | 375/1 |
| 5,204,876 | 4/1993 | Bruckert et al. | 375/200 |
| 5,319,672 | 6/1994 | Sumiya et al. | 375/208 |
| 5,341,396 | 8/1994 | Higgins et al. | 375/1 |
| 5,515,396 | 5/1996 | Dalekotzin | 375/206 |
| 5,544,155 | 8/1996 | Lucas et al. | 370/342 |
| 5,625,639 | 4/1997 | Tomita et al. | 375/200 |
| 5,652,748 | 7/1997 | Jolma et al. | 370/320 |
| 5,654,980 | 8/1997 | Latva-aho et al. | 375/208 |
| 5,673,260 | 9/1997 | Umeda et al. | 370/342 |
| 5,706,275 | 1/1998 | Zhengdi | 370/204 |

FOREIGN PATENT DOCUMENTS

| | | |
|---|---|---|
| 0 652 647 A1 | 5/1995 | European Pat. Off. . |
| WO 95/03652 | 2/1995 | WIPO . |
| WO 95/23459 | 8/1995 | WIPO . |

OTHER PUBLICATIONS

K. Rikkinen: Comparison of very low rate coding methods for CDMA radio communications system, IEEE ISSTA Proceedings, Jul. 4–6, 1994, University of Oulu, Finland, pp. 268–272.

*Primary Examiner*—Chi H. Pham
*Assistant Examiner*—Kwang B. Yao
*Attorney, Agent, or Firm*—Perman & Green, LLP

[57] ABSTRACT

The invention relates to a transmitter, a receiver and a data transmission method in a CDMA cellular radio system comprising in each cell at least one base station (100) and a number of subscriber terminals (102–108), and in which method the base stations communicate with terminal equipments situated within their area by using an at least partly overlapping frequency band, and wherein the signal of each user is modulated with one or several pseudo-random sequences the bit rates of which are substantially higher than the symbol rates of the users. In order to simplify multirate transmission, the pseudo-random sequence set (202–206) to be allocated to each user is selected on the basis of the symbol information contained in the user signal and the information rate required, and the subset to be modulated is selected from said set on the basis of the symbols to be transmitted.

19 Claims, 3 Drawing Sheets

DATA TRANSMISSION METHOD, TRANSMITTER, AND RECEIVER

FIELD OF THE INVENTION

The invention relates to a data transmission method in a CDMA cellular radio system comprising in each cell at least one base station and a number of subscriber terminals, and in which method the base stations communicate with terminal equipments situated within their area by using an at least partly overlapping frequency band, and wherein the signal of each user is modulated with one or several pseudo-random sequences the bit rates of which are substantially higher than the symbol rates of the users.

BACKGROUND OF THE INVENTION

CDMA (Code Division Multiple Access) is a multiple access method, which is based on the spread spectrum technique and which has been applied recently in cellular radio systems, in addition to the prior FDMA and TDMA methods. CDMA has several advantages over the prior methods, for example spectral efficiency and the simplicity of frequency planning. An example of a known CDMA system is the broadband cellular radio standard EIA/TIA IS-95.

In the CDMA method, the narrow-band data signal of the user is multiplied to a relatively wide band by a pseudo-random sequence or a spreading code having a considerably broader band than the data signal. In known test systems, bandwidths such as 1.25 MHz, 10 MHz and 25 MHz have been used. In connection with multiplying, the data signal spreads to the entire band to be used. All users transmit by using the same frequency band simultaneously. A separate pseudo-random sequence is used over each connection between a base station and a mobile station, and the signals of the different users can be distinguished from one another in the receivers on the basis of the pseudo-random sequence of each user.

Matched filters provided in the receivers are synchronized with a desired signal, which is recognized on the basis of the pseudo-random sequence. The data signal is restored in the receiver to the original band by multiplying it again by the same pseudo-random sequence that was used during the transmitting stage. Signals multiplied by some other pseudo-random sequence do not correlate in an ideal case and are therefore not restored to the narrow band. They appear thus as noise with respect to the desired signal. The pseudo-random sequences or spreading codes of the system are preferably selected in such a way that they are mutually orthogonal, i.e. they do not correlate with each other.

CDMA systems generally employ so-called short codes that have typically the same length as the symbols to be transmitted and that are also constant in time, i.e. each symbol of the signal to be transmitted is multiplied with the same spreading code. When short codes are used, some advantages have been achieved especially in connection with the multiuser detection (MUD) and interference cancellation methods. In the MUD methods, the signals of several users are detected simultaneously by utilizing all the received information in the detection of the signals. The parameters used in the known MUD algorithms, particularly the so-called correlation matrix that contains the mutual correlations of the received signal components, are constant when using short codes and therefore they do not have to be estimated symbol by symbol. The drawback of the short codes, however, is that their number is limited, which results in the shortage of useful codes having good correlation properties for example during a handover or in a multirate system.

A multirate system refers to a system where the user signals can have different types of bit or symbol rates, depending on the service used. For example speech and data services may require different transmission rates. In prior art arrangements a multirate system is supposed to be implemented with methods of code division or subcode modulation. The former method means that a user requiring a greater data rate is given a set of codes of the length of a symbol and they are transmitted on parallel physical channels, each modulated with a different information symbol. In the latter method the user is given a set of codes having the length of a part of a symbol. In the subcode modulation it can be considered that the bit rate grows but the bit rate or chip rate of the spreading code and the allocated code remain constant. According to the method, the subcodes having the length of a part of a symbol are modulated, in which case the properties of the subcodes can generally no longer be controlled.

A so-called R-CDMA method where subsets of a long code are modulated is previously known. The prior art also includes methods of applying orthogonal and biorthogonal coding methods, for example the reference *Comparison of very low rate coding methods for CDMA radio communications system* by K. Rikkinen (IEEE ISSTA Proceedings, Jul. 4–6, 1994, University of Oulu, Finland), pp. 268–272.

The drawback of the above-described known methods is that the code control is lost or the number of codes is not sufficient. A method of the R-CDMA type provides a large number of codes for use, but the drawback is the uncontrolled randomness of a single code in the properties of the codes.

CHARACTERISTICS OF THE INVENTION

The purpose of the present invention is to implement a CDMA data transmission method wherein the code set to be used can be increased so that the properties of the codes remain the same or are improved and that there is no uncontrolled randomness. The purpose of the invention is also to provide a multirate system in an advantageous manner. Another purpose of the invention is to enable multiuser detection in a rather simple manner.

This is achieved with a method of the type described in the preamble, characterized in that the pseudo-random sequence set to be allocated to each user is selected on the basis of the symbol information contained in the user signal and the information rate required, and that the subset to be modulated is selected from said set on the basis of the symbols to be transmitted.

The invention also relates to a transmitter in a CDMA cellular radio system comprising in each cell at least one base station and a number of subscriber terminals, the base stations communicating with terminal equipments situated within their area by using an at least partly overlapping frequency band, and which transmitter comprises means for modulating the user signal to be transmitted with one or several pseudo-random sequences the bit rates of which are substantially higher than the symbol rate of the user signal. The transmitter according to the invention is characterized in that the transmitter comprises means for selecting the pseudo-random sequences modulating the user signal on the basis of the symbol information comprised by the signal and the information rate required, and means for selecting from said set the subset to be modulated on the basis of the symbols to be transmitted.

The invention also relates to a receiver in a CDMA cellular radio system comprising in each cell at least one base station and a number of subscriber terminals, the base stations communicating with terminal equipments situated within their area by using an at least partly overlapping frequency band, and wherein the signal of each user is modulated with one or several pseudo-random sequences the bit rates of which are substantially higher than the symbol rates of the users. The receiver according to the invention is characterized in that the receiver comprises means for identifying from the received signal, on the basis of the signal correlations, the modulating pseudo-random sequence set used when transmitting the signal.

DESCRIPTION OF THE FIGURES

In the following, the preferred embodiments of the invention will be described in greater detail with reference to the examples according to the accompanying drawings, in which.

DESCRIPTION OF THE PREFERRED EMBODIMENTS

Figure 1:
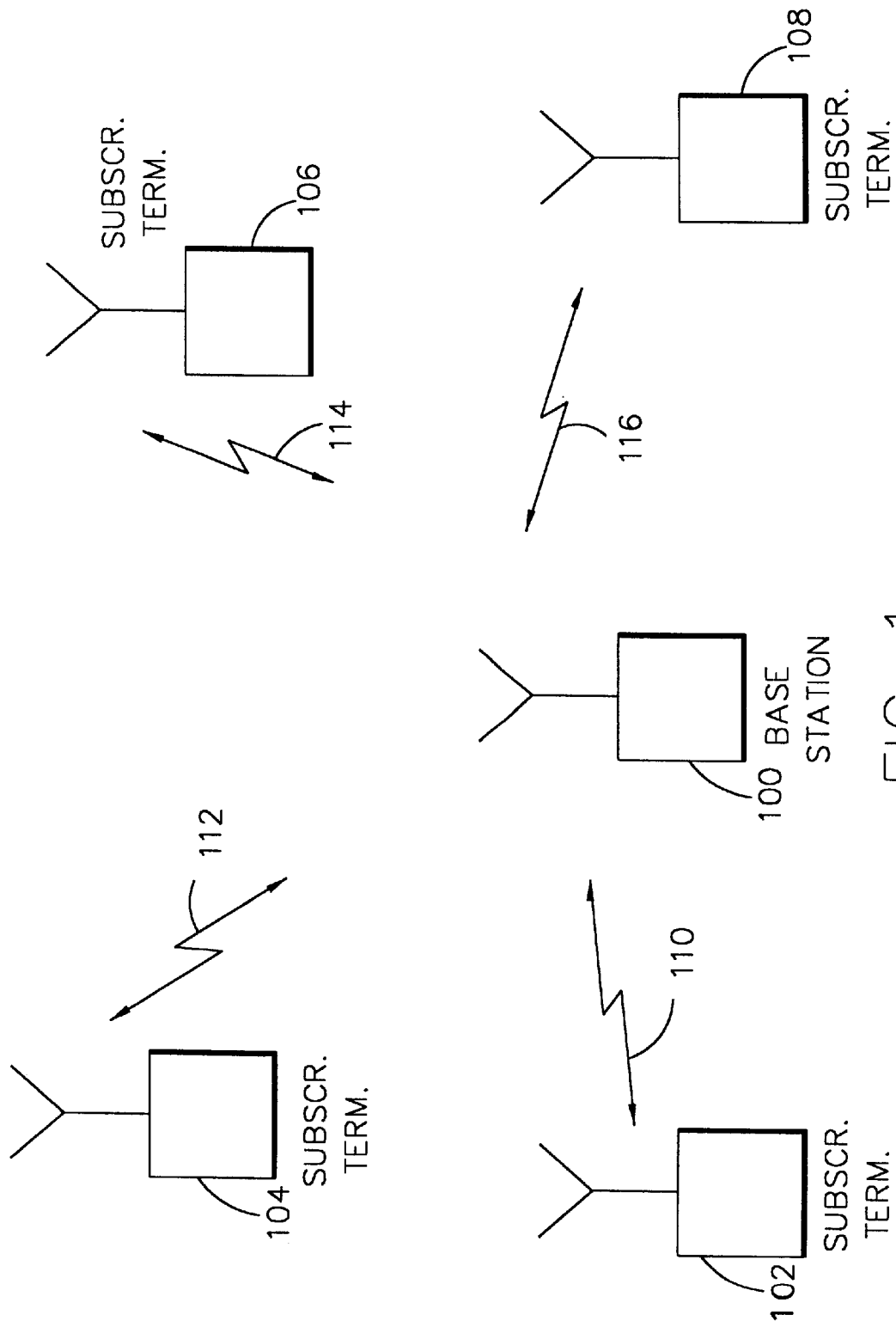
FIG. 1 illustrates a cellular radio system in which the method according to the invention can be applied.

FIG. 1 illustrates a cellular radio system wherein the method according to the invention can be applied. The system comprises in each cell at least one base station 100 and a number of subscriber terminals 102 to 108 each of which is connected 110–116 to the base station. The same frequency is used over each connection, but each terminal equipment may have a different data rate, if required.

The invention thus relates to a method with which the pseudo-random sequence waveforms, i.e. spreading codes, to be used over different connections are selected, the information symbols of the users being multiplied with these waveforms before transmission.

Assume that $$S = \bigcup_{k=1}^{KM} S_k$$

is a group of waveforms determined for a given time slot [0, T), the group being divided into K*M parts where K is the number of users and M is the dimension of the modulation used. Assume further that C is a selection function by means of which the symbols of the user to be transmitted, either coded or uncoded, are mapped to the aforementioned group, e.g. $C:\{-1, 1\}^{n1} \rightarrow S$. The encoded bits are obtained by using a memory element, such as a convolution coder, as it is apparent for a person skilled in the art. The aforementioned mapping C can be formed in such a way that the properties of the codes can be controlled and the required data transmission characteristics can be maximized with an implementation that is as simple as possible. It is assumed below, without restricting the generality, that the information to be transmitted consists of frames of a given length, and that the aforementioned mapping C remains constant during the frames.

In the simplest case, for example in the conventional BPSK CDMA system, the aforementioned mapping can be implemented in such a way that the selection function C is divided into parts $C=(C_1, \ldots, C_K)$. The information flow is therefore described with the function $C_K$:

$$C_k: \{-1, 1\} \rightarrow \{S_k, -S_k\}.$$

In the arrangement according to the invention, the group of possible waveforms is increased in such a way that at each moment one user may have one or more waveforms without restricting them to orthogonal or biorthogonal waveforms.

The mapping of the uncoded or coded information flow of the Kth user to the symbol level at moment i is denoted with the function $$C^{(i)}=(C_1^{(i)}, \ldots, C_k^{(i)}).$$

The mapping may therefore vary at different times. The code alphabet to be used, i.e. the set of spreading codes, should be defined in such a way that for example when the data rate changes, the optimality and control of the code selection are maintained. This is possible when the code alphabet is defined sufficiently large. In the arrangement according to the invention, a sufficient set $S_k$ of different codes are reserved for each user, and a subset is selected from this reserved set at each instant, the information being transmitted by means of the subset. The information to be transmitted is utilized in the selection of the code subset. The code sets reserved for each user do not have to be mutually orthogonal in the arrangement according to the invention, which enables a large number of codes and therefore a great number of different information channels and data rates to be used. An example of a possible code set is the L-Kasami where the number of the optimized codes is considerably greater than the length of the code.

Assume for example that the amplitude of a waveform transmitted in the system is constant (e.g. BPSK). The symbol of the ith user, which can be assumed here to consist of two bits, can be mapped to the waveforms S in the following manner:

++→s1
+−→s2
−+→−s2
−−→−s1

If the symbol period remains constant, the above-described method selects the waveform to be transmitted and doubles the data rate. If the symbol period is above 2T, the data rate does not change, but the signal dimension and thus the code properties are improved.

Figure 2:
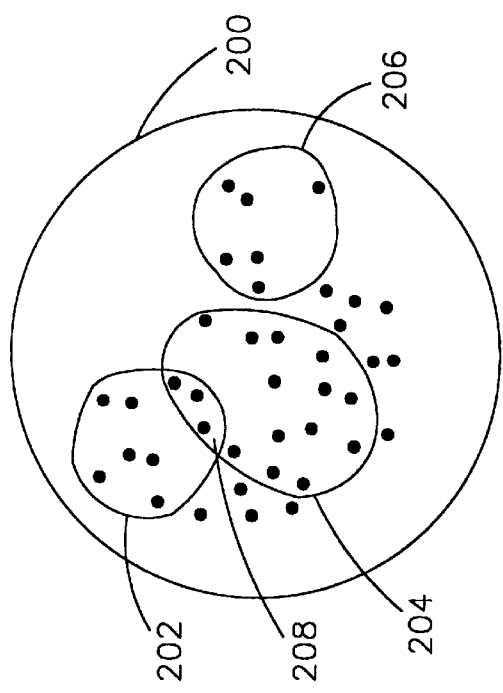
FIG. 2 illustrates the allocation of code sets to different connections.

The allocation of code sets to different connections is illustrated in FIG. 2. The figure shows by means of points 200 a group of waveforms among which the waveforms to be used over different connections are selected. The example of the figure has three connections 202, 204, 206, and a subset of waveforms have been reserved for each connection and the waveforms used over each connection at each instant are selected from the subset. The waveforms reserved for the different users are not necessarily mutually orthogonal. Even the same waveforms can be used over the connections, such as in the example of the figure over the connections 202 and 204 which comprise a group 208 of common waveforms.

In the arrangement according to the invention, the information symbols to be transmitted, which may be either coded or uncoded, affect the selection of the modulating waveform used at each instant. According to a preferred embodiment of the invention, the waveforms to be allocated and the set $S_k$ are selected according to how many symbols the information to be transmitted contains per time unit. According to another second preferred embodiment of the invention, the first bits in the frames of the frame-structured information to be transmitted determine the type of the waveform to be used, and the following bits determine the actual waveform from the selected waveform type. By applying this principle it is also possible to modulate the selected waveforms for example on the basis of the first bits of the frames.

In the following, a numerical application will be described by way of example. Assume that the bandwidth of the system is 5 MHz, the length of the spreading codes is 256 and the symbol rate is 20 ks/s. A subset of codes are reserved for each user. When a terminal equipment selects one waveform to be used for transmission, altogether $L=2^{n1}$ waveforms are needed for n1-fold data rate. If the system uses M-dimensional modulation, L/M waveforms are needed. L/2 signals are therefore needed for antipodal signals. If the code set is doubled for example for an offset of N/2 chips due to the delay spread of the channel, L/4 codes are needed for n1-fold data rate. For four-dimensional symbols, $L/8=2^{n1-3}$ codes are needed. Therefore four-fold data rate can be obtained with one spreading code and with a simple receiver output stage. The size of the code set can be doubled by providing each user with two codes to be transmitted in parallel: five-fold data rate with two codes and six-fold data rate with three codes per user. The method can also be combined with a multirate method to be realized with subcode modulation.

The number of the codes to be used will not be a problem in the arrangement according to the invention. If it is assumed for example that one user has an eight-fold data rate with the symbol rate of 160 ks/s, 5 users with the five-fold data rate of 100 ks/s and one hundred users with the lowest data rate, the number of the waveforms required is $128+5*2^4+100=308$. From these 308 waveforms only 106 are simultaneously active at each instant. The active codes can be selected from the desired code set, for example the L-Kasami, so that the correlations are controlled.

The method according to the invention can utilize the properties of the transmission channel in the selection of the code set. For example, if the channel delay spread is T/2, the set S may contain a code $S_k$ and the N/2 cyclic shift thereof, where N is the length of the code. In such a case, the complexity of the receiver is reduced, since the signal can be received with the same code.

The set $S_k$ can also be realized by means of an orthogonal group H and a mixing sequence $C_k$:

$S_k$=H diag($C_k$).

This can be expanded in the following manner:

$$S_k = \begin{bmatrix} H\,diag(c_{k,1}) \\ H\,diag(c_{k,2}) \end{bmatrix},$$

wherein the sequences $C_{k,i}$ are typically user-specific and they can be selected by means of the information symbols or they may be each other's cyclic shifts and H is the Hadamard set.

Figure 3:
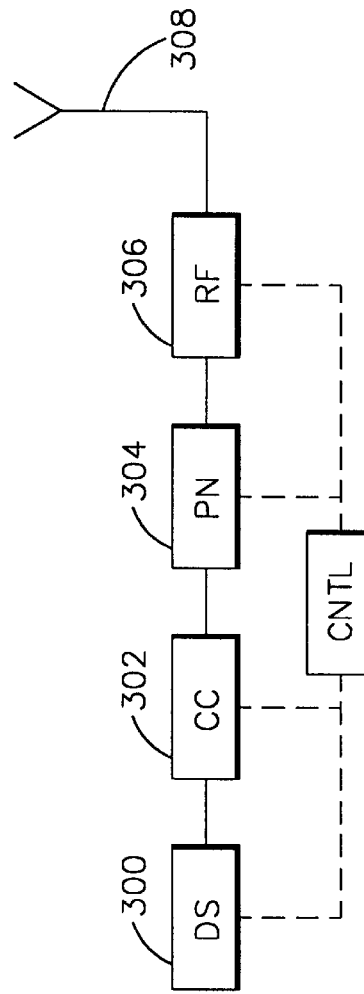
FIG. 3 is a block diagram illustrating the structure of a transmitter according to the invention.

FIG. 3 is a general block diagram illustrating the structure of a transmitter according to the invention. The transmitter comprises a data source 300, means 302 for performing channel coding, means 304 for modulating the signal to be transmitted with one or several pseudo-random sequences, and radio-frequency means 306 that transfer the signal to be transmitted to the frequency range used over the radio path, and an antenna 308. The transmitter also comprises a control unit 310 that controls the operation of the transmitter elements. The control unit 310 is typically realized by means of a microprocessor. The transmitter also comprises means 310 for selecting the pseudo-random sequences modulating the user signal on the basis of the information contained in the user signal by utilizing the above-described methods. The transmitter to be implemented may naturally also comprise other components, such as filters, A/D converters and a user interface, such as a keyboard and a display unit, as it is apparent for a person skilled in the art, but since they are not essential to the present invention, they are not shown in the figure for the sake of clarity. Also, the transmitter may comprise for example a microphone and a speech coder instead of a data source.

According to a preferred embodiment of the invention, the transmitter comprises means (310) for selecting the pseudo-random sequences modulating the user signal according to how many symbols the signal to be transmitted comprises per time unit. According to another preferred embodiment of the invention, the means (310) of the transmitter select the type of the sequence set to be used on the basis of the first bits in the frame, and they select the actual sequences from the selected sequence type on the basis of the last bits.

Figure 4:
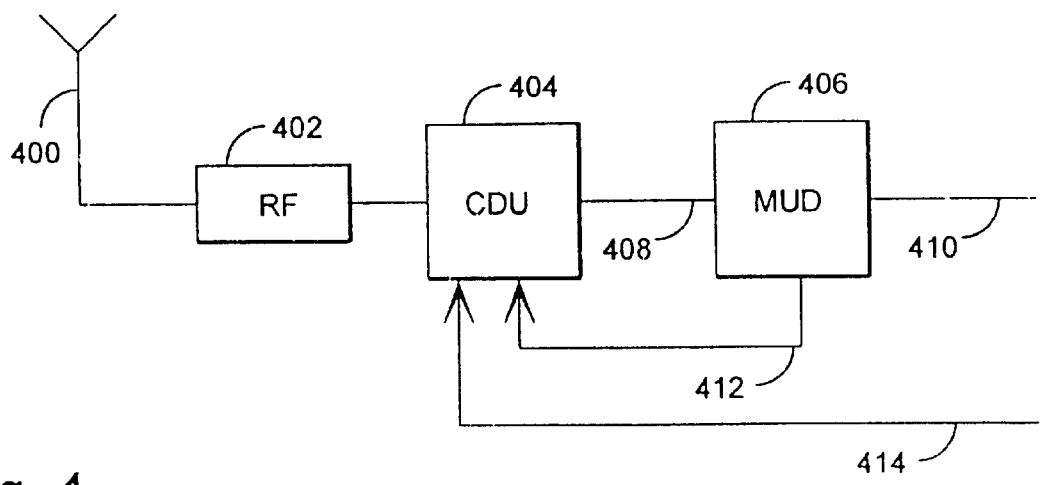
FIG. 4 is a block diagram illustrating the structure of a receiver according to the invention.

Examine next the structure of the receiver according to the invention. The complexity of the receiver structure depends on the number of the waveforms used. Each additional phase shift doubles the number of the correlators required. FIG. 4 illustrates a possible structure of the receiver according to the invention by means of a block diagram. The receiver comprises an antenna 400 receiving a signal that is applied to radio-frequency parts 402 where the signal is converted into an intermediate frequency. The resulting signal is applied further to processing means 404, typically a signal processor, where one or more modulating waveforms or spreading codes used are detected from the received signal.

The function of the means 404 is to identify for each symbol interval which waveform has been used. The actual code detection is carried out in the signal processing means 406 where the multiuser detection can also be applied or desired known interference cancellation methods can be applied. The interference cancellation can be carried out for example in such a manner that the interference signals are regenerated and they are subtracted from the desired transmission in the order of magnitude. In the receiver the signal processing is distributed into two parts, the first one 404 including the code detection and the second one 406 comprising the actual detection. After the detection the obtained signal 410 is further applied to other parts of the receiver. In the practical implementation, the aforementioned elements can naturally be combined into one physical component, as it is apparent for a person skilled in the art. There may also be feedback between the blocks. The feedback 412 from the detection means to the processing unit 404 enables for example the use of multiuser detection in the code selection. Feedback information may comprise for example symbol decisions of the user, channel parameters or a regenerated wideband or narrow-band interference signal. The feedback 414 can also be carried out from the later stages of the receiver. For example symbol decisions can be obtained after the channel decoder, for instance. By means of the feedback it is possible to decrease known interference components in the processing unit 404.

The receiver to be implemented may naturally also comprise other components, such as filters, D/A converters and a user interface, such as a keyboard and a display unit, as it is apparent for a person skilled in the art, but since they are not essential to the present invention, they are not shown in the figure for the sake of clarity.

Even though the invention is described above with reference to the example according to the accompanying drawings, it is clear that the invention is not limited thereto, but it can be modified in many ways within the scope of the inventive idea disclosed in the appended claims.

It is apparent for a person skilled in the art that for example the transmitter according to the invention may also utilize other known methods for increasing the data rate, such as changing the code amplification and parallel transmission.

What is claimed is:

1. A data transmission method in a CDMA cellular radio system comprising in each cell at least one base station and a number of subscriber terminals, wherein the method comprises steps of:

providing communication among the base stations with terminal equipments situated within their area by using an at least partly overlapping frequency band;

modulating a signal of each user with one or several pseudo-random sequences having bit rates which are substantially higher than symbol rates of users of the radio system;

allocating a pseudo-random sequence set to each of said users selected on a basis of symbol information contained in the user signal and required information rate; and with respect to a subset of said pseudo-random sequence set to be modulated, selecting the subset from said set on the basis of symbols to be transmitted, wherein waveforms are allocated according to how many symbols are contained in the information to be transmitted per time unit, and the size of a code set is increased with higher data rate;

wherein said allocating step includes a further step of assigning different sets of pseudo-random sequences to respective ones of the user signals.

2. A method according to claim 1, wherein, in said allocating step, at least one sequence set allocated to a user is not orthogonal with another sequence allocated to the user.

3. A method according to claim 1, wherein, in said allocating step, the pseudo-random sequences allocated to each user are selected according to how many symbols per unit of time the signal to be transmitted contains.

4. A method according to claim 1, wherein, in said allocating step, two or more pseudo-random sequences are reserved for each user, and then when the user signal is transmitted, the pseudo-random sequences to be used at each instant are selected from the set of reserved sequences on the basis of the current symbol information of the signal.

5. A method according to claim 1, wherein, in said modulating step, the symbols to be modulated with the pseudo-random sequence are frame-structured bits, and that some of the frame bits determine the sequence set to be used and some determine the actual sequences from the selected sequence set.

6. A method according to claim 1, wherein, in said modulating step, the symbols to be modulated with the pseudo-random sequences are coded symbols.

7. A method according to claim 1, further comprising a step of connecting a base station to a mobile station within said radio system by employing connections comprising different data rates, and wherein the connections of different data rates of a user are realized user-specifically with different numbers of pseudo-random sequences.

8. A method according to claim 1, wherein, a common pseudo-random sequence can be simultaneously used by more than one user signal within the same coverage area.

9. A method according to claim 1, wherein, in said allocating step, one of the sequences allocated to a user may differ by a cyclic shift from another one of said sequences.

10. A method according to claim 1, wherein, in said allocating step, there are one or more codes selected to be transmitted, which codes are multiplied with a sequence that is selected on the basis of information to be transmitted.

11. A transmitter in a CDMA cellular radio system comprising:

in each cell of said radio system, at least one base station and a plurality of subscriber terminals, wherein the base stations of said at least one base station communicate with subscriber terminal equipments situated within the area of said base stations by using an at least partly overlapping frequency band;

wherein the transmitter comprises means for modulating a user signal to be transmitted with one or several pseudo-random sequences of a set of pseudo-random sequences having bit rates which are substantially higher than a symbol rate of the user signal;

wherein the transmitter further comprises means for selecting pseudo-random sequences modulating the user signal on the basis of symbol information comprised of the user signal and required information rate, wherein waveforms are allocated according to how many symbols are contained in the information to be transmitted per time unit, and the size of a code set is increased with higher data rate;

means for selecting from said set a subset to be modulated on a basis of symbols to be transmitted; and means for providing plural sets of the pseudo-random sequences with assignment of different sets of the pseudo-random sequences to respective ones of the user signals.

12. A transmitter according to claim 11, further comprising means for selecting the pseudo-random sequences modulating the user signal in such a way that at least one sequence allocated to the user signal is not orthogonal with another sequence allocated to the user signal.

13. A transmitter according to claim 11, further comprising means for allocating two or more pseudo-random sequences for use over a connection, and means for selecting the pseudo-random sequences to be used at each instant from the set of allocated sequences on the basis of the current symbol information of the signal.

14. A transmitter according to claim 11, wherein the symbols to be modulated with the pseudo-random sequence comprise a series of bits arranged in a frame, and the transmitter comprises means for selecting the type of the sequence set to be used on the basis of some bits in the frame, and means for selecting sequences from the selected sequence type on the basis of some other bits of the frame.

15. A transmitter according to claim 11, further comprising means for encoding bits to be transmitted before they are multiplied with the selected pseudo-random sequence.

16. A receiver in a CDMA cellular radio system comprising:

in each cell, at least one base station and a plurality of subscriber terminals, wherein the base stations of said at least one base station communicate with terminal equipments situated within the area of the base stations by using an at least partly overlapping frequency band;

wherein a signal of each user is modulated with one or several pseudo-random sequences having bit rates which are substantially higher than symbol rates of the user signals;

the receiver comprises means for identifying from a received signal, on the basis of signal correlations, a modulating pseudo-random sequence set used when transmitting the signal; and different sets of pseudo-random sequences have been assigned to respective ones of the user signals, wherein waveforms are allocated according to how many symbols are contained in the information to be transmitted per time unit, and the size of a code set is increased with higher data rate, and said receiver further comprises correlating means for identifying the different sets of the pseudo-random sequences of respective ones of the user signals.

17. A receiver according to claim 16, wherein the receiver comprises a demodulator which demodulates and detects simultaneously several different user signals.

18. A receiver according to claim 16, wherein the receiver comprises means for performing interference calculation on the received signal.

19. A receiver according to claim 16, further comprising a feedback from a demodulator to an identification means for pseudo-random sequences.

* * * * *